United States Patent [19]
Buchholz

[11] Patent Number: 5,632,243
[45] Date of Patent: May 27, 1997

[54] SELF-CLEANING AIR FILTER ASSEMBLY

[75] Inventor: Brian S. Buchholz, Chilton, Wis.

[73] Assignee: Tecumseh Products Company, Tecumseh, Mich.

[21] Appl. No.: 583,755

[22] Filed: Jan. 11, 1996

[51] Int. Cl.$^6$ .................................................. F02B 77/00
[52] U.S. Cl. .................. 123/198 E; 55/301; 55/DIG. 28
[58] Field of Search .................. 123/198 E; 55/301, 55/DIG. 28, 486

[56] References Cited

U.S. PATENT DOCUMENTS

| | | | |
|---|---|---|---|
| 4,396,407 | 8/1983 | Reese | 123/198 E |
| 4,425,145 | 1/1984 | Reese | 55/DIG. 13 |
| 5,046,458 | 9/1991 | Kronich | 123/41.63 |
| 5,133,315 | 7/1992 | Reese | 123/198 E |
| 5,553,587 | 4/1996 | Conoscenti | 123/198 E |

*Primary Examiner*—Noah P. Kamen
*Attorney, Agent, or Firm*—Baker & Daniels

[57] ABSTRACT

The present invention involves a self-cleaning air filter assembly for an internal combustion engine. An air stream is directed into an air filter housing and a portion of the air stream is filtered by an air filter assembly which may include one or more filter media and the remaining portion of the air stream is discharged from the air filter housing through an exit opening. Particulates contained within the excess air are discharged along with the excess air through the exit openings and are not deposited on the air filter. Vibration of the air filter due to operation of the engine also loosens previously filtered particulates which are also discharged through the exit openings with the excess air. The cleaned air which is passed through the air filter is used in the combustion process.

14 Claims, 4 Drawing Sheets

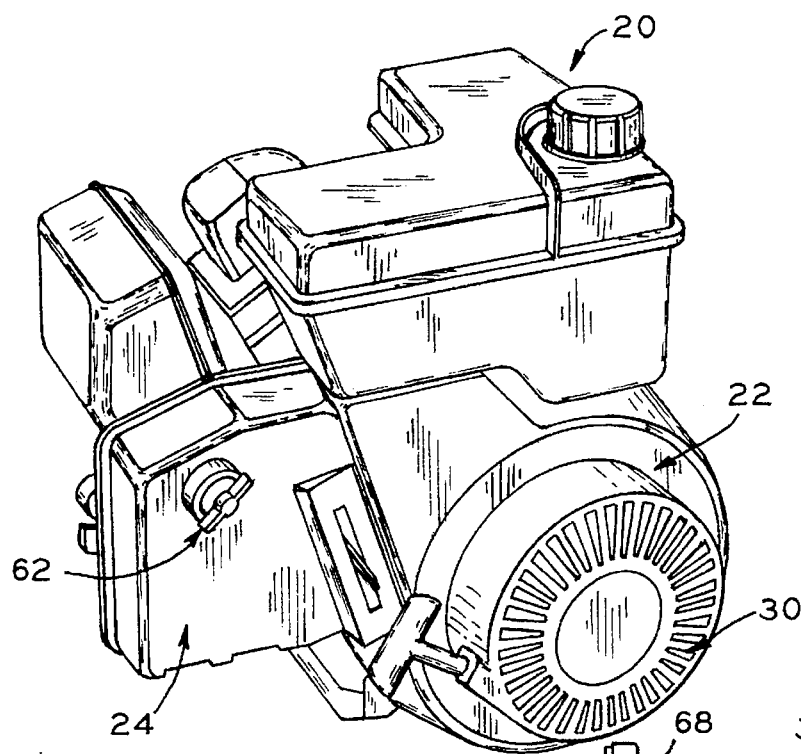
FIG_1
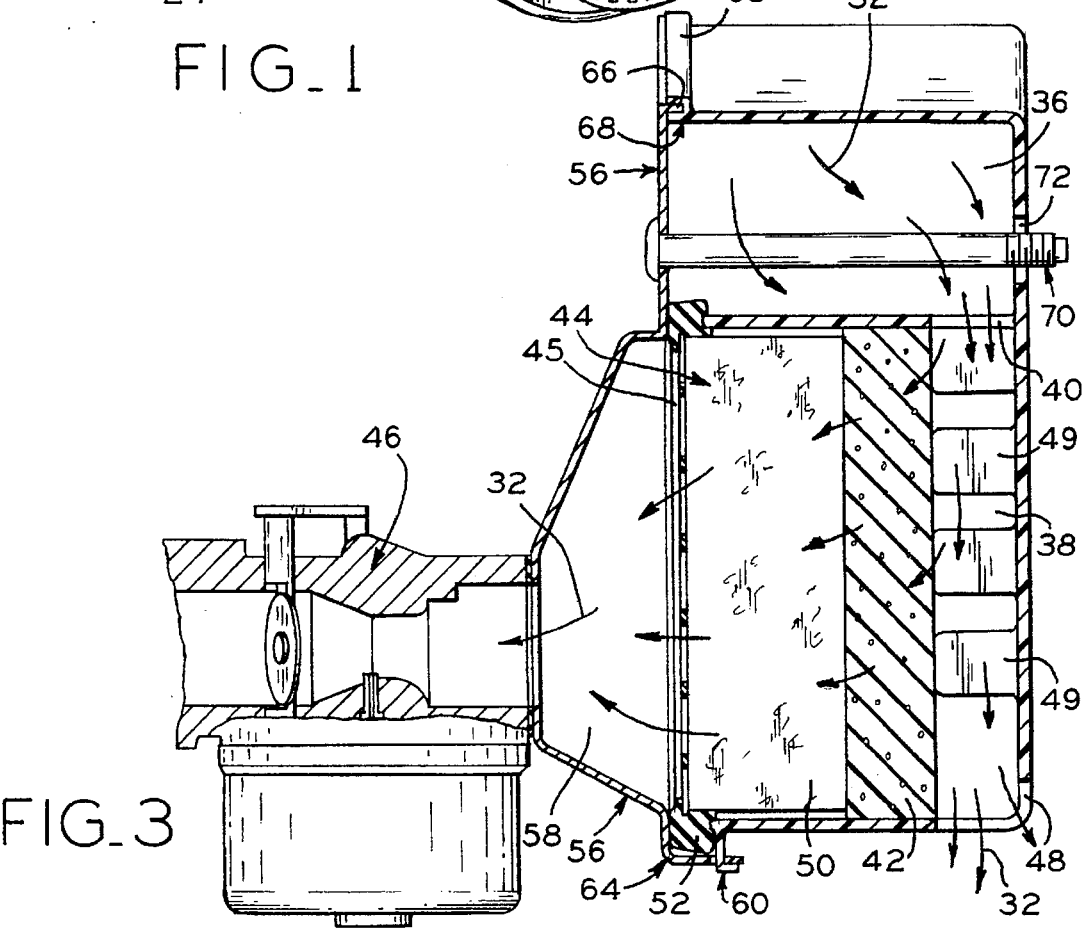
FIG_3

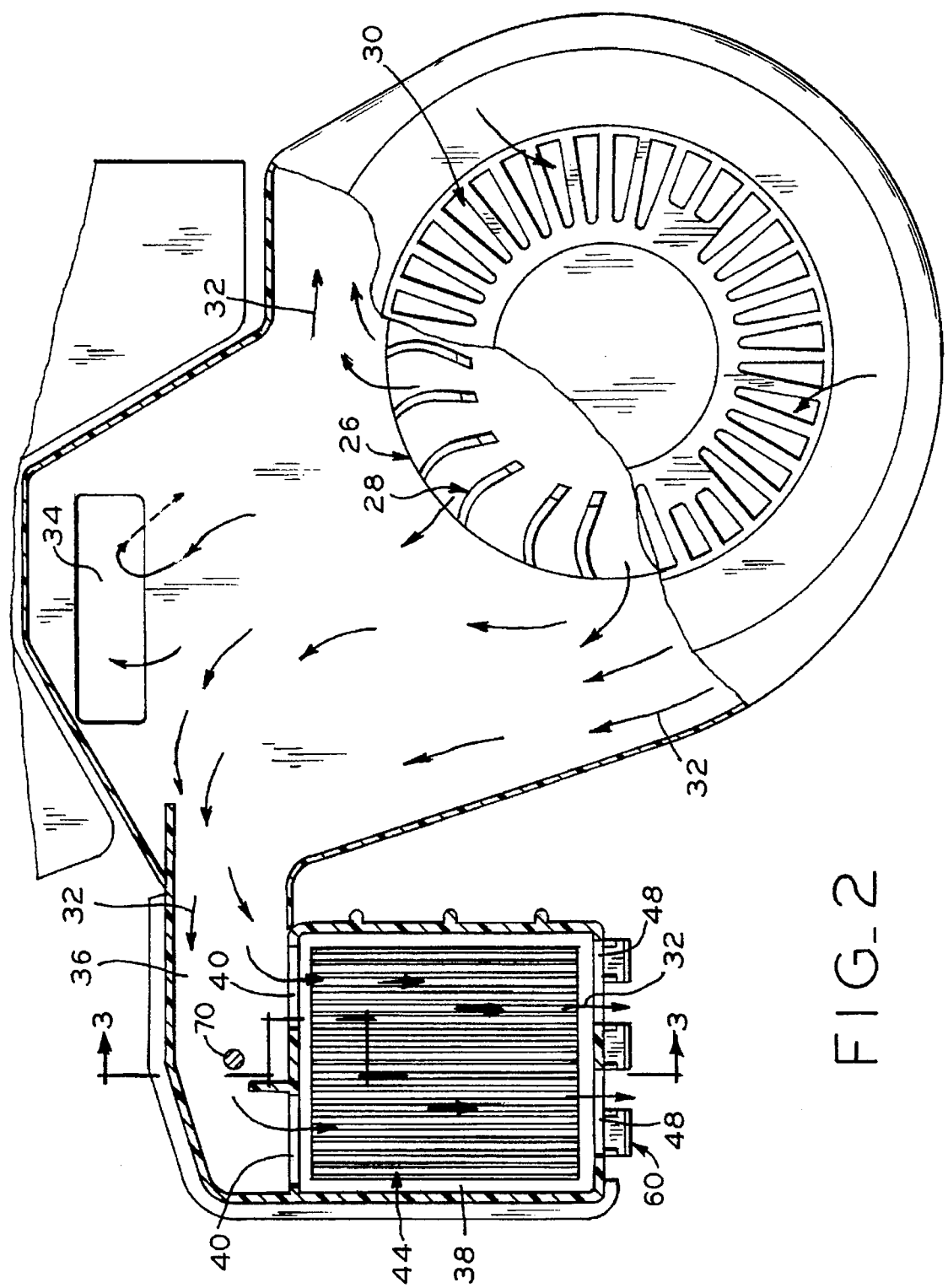
FIG_2

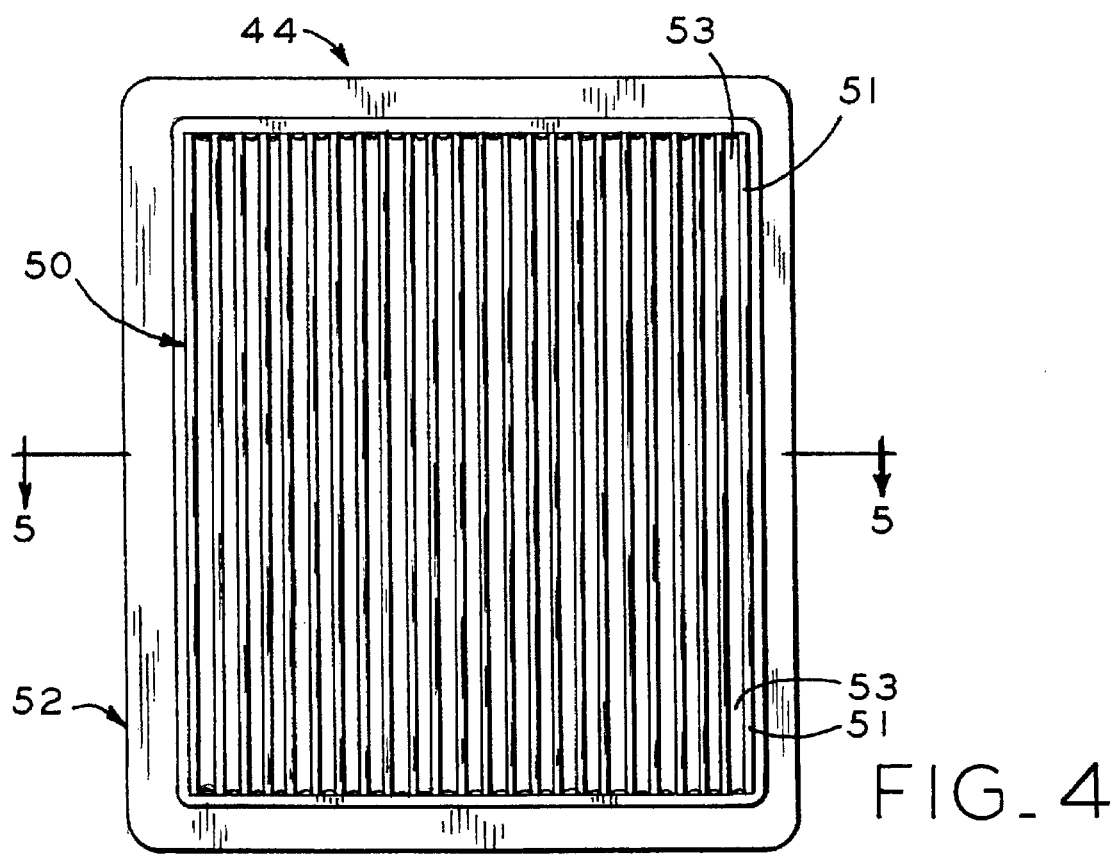
FIG_4
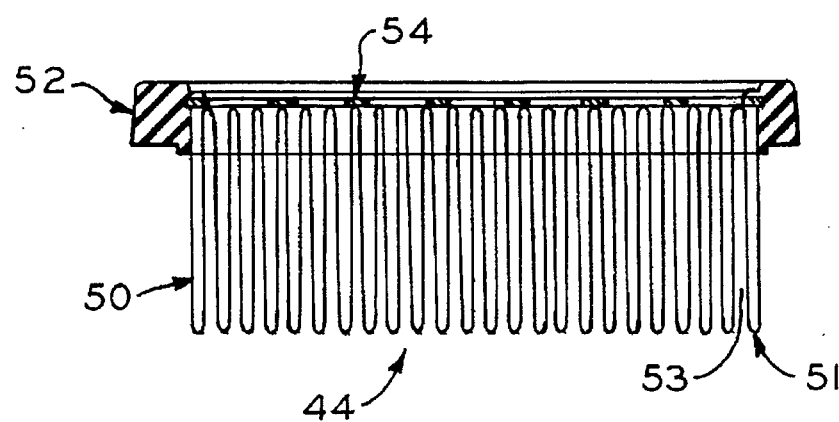
FIG_5

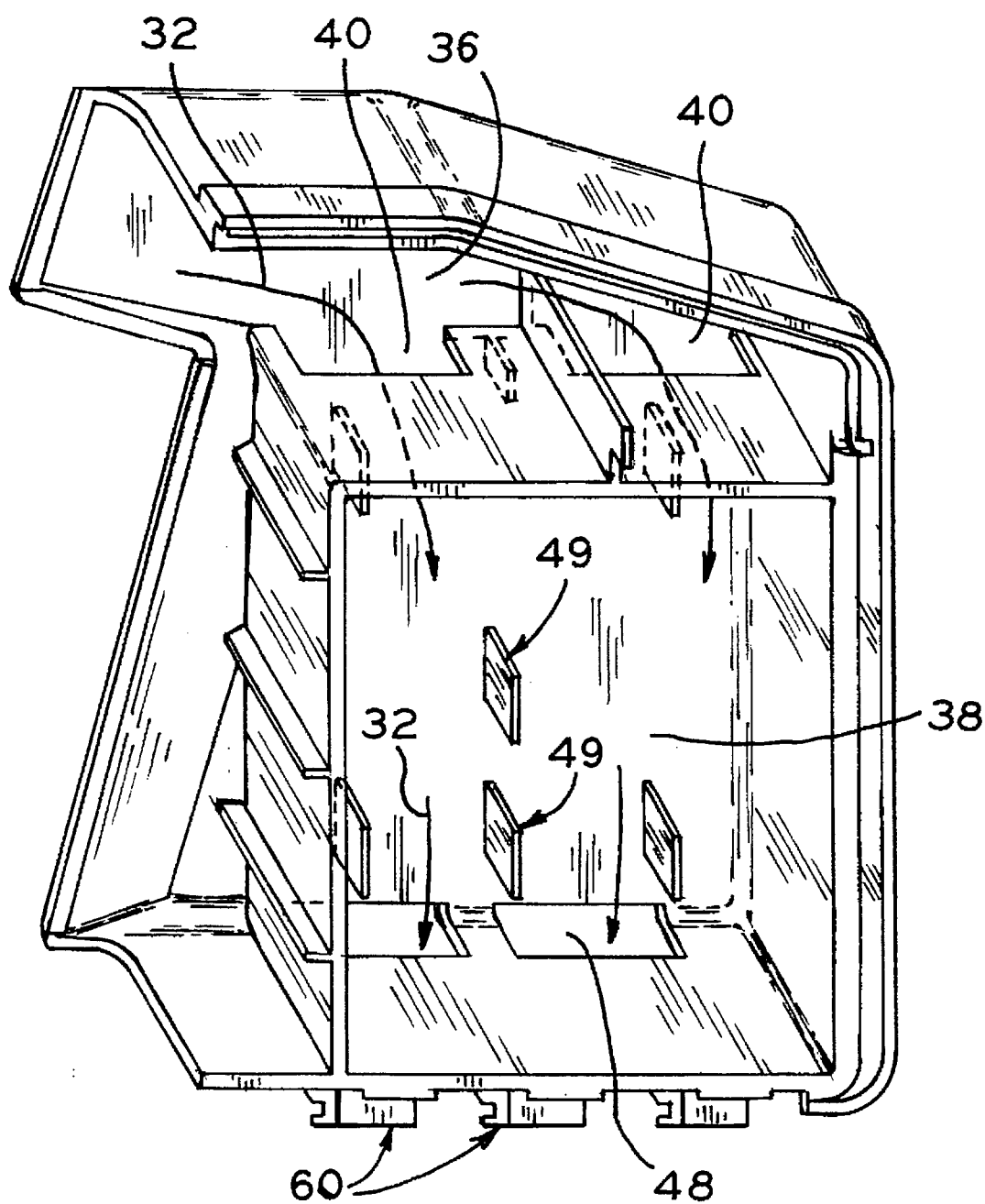
FIG_6

SELF-CLEANING AIR FILTER ASSEMBLY

BACKGROUND OF THE INVENTION

1. Field of the Invention

The present invention relates generally to air filter systems for small internal combustion engines, and more specifically, to an air filter assembly for filtering air prior to the air entering the carburetor.

2. Description of the Related Art

The filtering of air prior to combustion is necessary to maintain an internal combustion engine in a satisfactory condition. Two of the more common air cleaning methods, often used in conjunction, are subjecting the airflow to abrupt changes in direction, which utilizes the forward inertia of the larger particulates to remove them from the continuing path of the airflow and filtering the airflow through one or more filter media.

In many small engines, such as those used with lawnmowers and other similar machinery, the air for combustion is withdrawn from the engine's blower housing by a conduit or duct leading to the air cleaner housing. Generally, once the air exits the blower housing and enters this duct, the heavier particulates which are removed from the airflow, due to abrupt changes in the direction of the airflow, are maintained internally within the duct and air cleaner housing. These heavier particulates accumulate within the housing and upon the air filter. The accumulation of particulates upon the air filter clogs or hinders the required airflow to the carburetor and necessitates the periodic replacement or cleaning of the air filter. It is also possible for worn or clogged filters to allow particulates to enter the engine where the particulates can produce detrimental wear due to their abrasive effects.

One approach to deterring the accumulated particulates from entering the engine is to provide a second filter, made of felt, for example, immediately downstream of a first filter which can be made of a polyurethane foam. When the first filter begins releasing particulates due to their excessive accumulation, the second filter traps and thereby prevents the particulates from entering the engine.

Another approach that has been taken to deter particulates from entering the engine is to reduce the amount of debris and particulates which initially enter the blower housing. This is often done by using a rotating screen which is placed over the air intake port and rotates along with the engine cooling fan. Much of the foreign matter that approaches the air intake port is flung away by the rotating screen. A stationary filtering device can also be placed over the air intake port to filter out much of the debris and particulates from the air before it enters the blower housing. A hole may also be placed in the blower housing to allow for the discharge of particulates separated from the air stream by the centrifugal forces generated by the blower.

None of these approaches, however, provides for the discharge of accumulated debris and particulates once they have entered the air cleaner duct or housing. The accumulation of debris and particulates within the air cleaner system can be particularly troublesome for small internal combustion engines for use with tillers, chipper/shredders, generators, snow blowers, water pumps, pressure washers, leaf blowers, vacuums, sweepers, log splitters, core pluggers, stump cutters, trenchers, thatchers, power rakes, sod cutters, lawn mowers, lawn rollers, two-wheel tractors, go-karts, mini-bikes, and other similar machinery which are often exposed to air containing a large quantity of particulates such as dirt, grass clippings and matted debris.

SUMMARY OF THE INVENTION

The present invention provides an air cleaner system which prevents particulates and heavier debris from entering the engine by providing for the discharge of heavier and accumulated particulates from the air cleaner system during normal operation of the engine through an exit opening within the air cleaner housing.

The invention comprises, in one form thereof, an air cleaner housing and connecting duct which direct a stream of air generated by the engine fan towards the air cleaner filter. The air cleaner housing has an exit opening which allows a portion of the air stream to exit the air cleaner housing after passing near the air cleaner filter. The discharged portion of the air stream carries with it many of the heavier particulates contained within the air stream and also removes some of the particulates and debris that had been previously deposited on the surface of the air cleaner filter and has been dislodged by either the vibrations caused by operation of the engine or the turbulence of the air stream. By locating the exit openings near the bottom of the air cleaner housing the discharge of particulates is assisted by the gravitational forces acting upon the particulates. If a pleated air filter is used, orienting the pleats in a vertical direction enhances the discharging effects of the gravitational forces and air stream.

An advantage of the present invention is that it provides the ability to discharge accumulated particulates from the air cleaner system during normal operation of the engine and thereby prevent the discharged particulates from entering the engine.

Another advantage is that, by discharging many of the particulates that would otherwise be deposited on the air cleaner filter, the useful life of the air cleaner filter is prolonged. Thus, the engine can be operated for a longer period of time between periodic replacement or cleaning of the air filter.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a perspective view of the present invention installed on a small internal combustion engine;

FIG. 2 is a cut-away view of blower housing and the air cleaner duct and housing;

FIG. 3 is a sectional view of the air cleaner system and carburetor taken along section line 3—3 of FIG. 2;

FIG. 4 is a view of a pleated paper air filter cartridge;

FIG. 5 is a sectional view of a pleated paper air filter cartridge taken along line 5—5 of FIG. 4; and FIG. 6 is a perspective view of the air filter duct and housing.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates an embodiment of the invention, in one form, and such exemplification is not to be construed as limiting the scope of the invention in any manner.

DESCRIPTION OF THE PRESENT INVENTION

The embodiment disclosed below is not intended to be exhaustive or limit the invention to the precise form disclosed in the following detailed description.

In an exemplary embodiment of the invention as shown in the drawings, and in FIGS. 1 and 2 in particular, an internal combustion engine 20 is shown having a blower housing 22 and air filter housing 24. The blower housing 22 encloses a flywheel 26 which is operatively connected to the crankshaft of the internal combustion engine 20. The flywheel 26 has blower vanes 28 which function as a fan to draw air into the blower housing 22 through screened inlet 30 when the flywheel 26 is rotating. Although screened inlet 30 is shown as an integral component of blower housing 22, a rotating screen may be used instead of screened inlet 30 or a preliminary filter, as disclosed in U.S. Pat. No. 5,133,315, may be used in addition to the screened inlet 30.

After the largest particles and debris are removed from the incoming air during passage through screened inlet 30, the blower vanes 28 impart a centrifugal velocity to the incoming air as shown in FIG. 2 by the arrows 32 which represent the direction of air flow. The centrifugal forces generated by the blower vanes 28 separate some of the heavier particles still present in the incoming air. The segregated particles migrate to the bottom the blower housing 22 due to gravity where they are discharged through an opening (not shown) in blower housing 22. The air is then forced from the blower housing 22 through cooling port 34 or into air filter duct 36. The air which passes through cooling port 34 is directed across the cylinder block and other parts of the internal combustion engine 20 to remove some of the excess heat generated by the operation of the engine 20.

The remainder of the air within the blower housing enters the air filter duct passage 36 under a slight positive pressure and having a significant velocity. The air within air filter duct passage 36 is then directed into the air filter compartment 38 through inlet openings 40. The air flow entering the air filter compartment 38 has a direction generally transverse to the inlet openings 40 after passing through the inlet openings 40. As shown by arrows 32 in FIG. 3, the air stream entering the air filter compartment 38 either passes through precleaning filter 42 and filter cartridge 44 before exiting the air filter compartment through the filter outlet port 45 and entering the carburetor 46 or is discharged through exit openings 48. The slight positive pressure of the air within air filter compartment 38 prevents particulates and hot air from being drawn into the air filter compartment 38 through the exit openings 48. An excess quantity of air is introduced into the air filter compartment 38 so that a portion of the air stream may be discharged through exit openings 48. The discharged portion of the air stream carries with it the particulates which are aloft in the discharged air stream and the heavier particulates which are discharged through the exit openings 48 due to their forward inertia or weight. The exit openings 48 are located at the bottom of the air cleaner housing and in line with the general direction of the air stream within the air filter compartment 38 to take respective advantage of the gravitational and inertial forces acting upon the particulates. The vibration of the engine and the turbulence of the air flow within the air filter compartment 38 tend to loosen and dislodge particulates previously trapped by the precleaning filter 42 or, if no precleaning filter 42 is used, filter cartridge 44. These dislodged particulates are then expelled through exit openings 48 due to the effects of gravity and the air stream within the air filter compartment 38. Orientation of the air filter compartment 38 to direct the flow of excess air in a downward direction enhances the ability of the excess air to discharge particulates present in the air stream and from the surface of the air filter by taking advantage of the gravitational forces acting upon the particulates.

The precleaning filter 42 may consist of a polyurethane foam block and is prevented from blocking the passageway between the inlet openings 40 and exit openings 48 by tabs 49. By using a precleaning filter 42 which is as large or slightly larger than the filter compartment 38, except for its width, the precleaning filter will fit tightly within filter compartment 38. This tight fit will inhibit or prevent the passage of particulates between the precleaning filter 42 and the walls of the filter compartment 38. Although FIG. 3 illustrates an embodiment in which all of the air which enters the carburetor 46 must first pass through precleaning filter 42 and filter cartridge 44, a precleaning filter 42 is not required and a filter cartridge 44 may be used by itself.

As shown in FIGS. 4 and 5, filter cartridge 44 may be a commonly available pleated paper filter. Other types of air cleaner filters may also be used. Filter cartridge 44 includes a paper element 50 which has been folded into pleats 51. Between adjacent folded pleats are elongate gaps 53 within which particulates may be trapped on the surface of pleats 51. A resilient sealing perimeter 52 secures a metal grill 54 to the paper element 50 and provides a seal between air filter compartment walls 39 and air filter mounting walls 56. The mounting walls 56 define a carburetor duct 58 which leads from the filter cartridge 44 to the carburetor 46 as well as one wall of the air filter duct 36. By orienting the pleats 51 of the paper element 50 in a vertical direction which runs parallel with the flow direction of the excess air, the self-cleaning effect of the excess air and gravity is enhanced. The vertical orientation of the pleats 51 and elongate gaps 53 permits particulates within the elongate gaps 53 to migrate, in a relatively unimpeded fashion, towards and then through the exit openings 48 under the influence of gravity and the air flow within the air filter compartment 38.

Orientation of the carburetor duct 58 in a primarily horizontal plane relative to the filter cartridge 44 also takes advantage of the gravitational forces acting upon the particulates and thereby inhibits loose particulates from falling into the carburetor when the air filter cartridge 44 is removed. By not placing the carburetor 46 below the air filter compartment 38, particulates loosened during servicing of the air filter will generally fall harmlessly to the ground under the influence of gravity instead of into the carburetor 46.

A unitary air filter housing 22 may be constructed of a plastic material such as high density polypropylene (i.e., HDPE) and used to form walls of both the air filter duct 36 and the air filter compartment 38. The air filter housing 22 may be attached to the engine 20 by using a series of mounting hooks 60 and a large wingnut 62. The mounting hooks 60 engage apertures in a lower lip 64 of the mounting walls 56 as shown in FIG. 3. An upper lip 66 of the mounting walls is also inserted between slot walls 68 of the air filter housing 24. A threaded fastener 70 is inserted through attachment aperture 72 and engages wingnut 62. The wingnut 62 can be turned by hand and thereby permits the servicing of the air filters 42 and 44 without the use of tools.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. In an internal combustion engine having a drive shaft and an air-fuel mixing device, an air supply and filtration system comprising:

a blower which is rotated by the drive shaft and a blower housing surrounding said blower and guiding an air stream produced by rotation of said blower;

a filter housing enclosing a filter compartment and defining an inlet opening, an exit opening and a filter outlet port, said inlet opening being in communication with said blower housing whereby a portion of the air stream is supplied under pressure and at a velocity at said inlet opening; and a filter medium disposed within the filter compartment between said inlet opening and said filter outlet port and defining with said filter housing a passageway between said inlet opening and said exit opening whereby the supplied air enters said filter compartment through said inlet opening, a portion of said supplied air is filtered by Said filter medium and directed through said filter outlet port to the air-fuel mixing device and a remaining portion of the supplied air is discharged through said exit opening.

2. The air supply and filtration system of claim 1 wherein said exit opening is disposed below said inlet opening.

3. The air supply and filtration system of claim 1 wherein said exit opening is disposed opposite and below said inlet opening and said passageway is in a substantially straight line of sight between said inlet opening and said exit opening.

4. The air supply and filtration system of claim 1 wherein said filter outlet port is disposed on a vertical side of said filter housing.

5. The air filter assembly of claim 1 wherein said filter medium is a pleated filter with vertically oriented pleats whereby said pleats guide the movement of particulates towards said exit opening.

6. The air filter assembly of claim 1 further comprising a precleaning filter disposed between said inlet opening and said filter medium.

7. The air filter assembly of claim 6 wherein said filter housing further comprises a plurality of tabs extending into said passageway whereby said precleaning filter is retained in a position outside of said passageway.

8. The air filter assembly of claim 1 wherein said exit opening is disposed opposite and below said inlet opening and said passageway is in a substantially straight line of sight between said inlet opening and said exit opening.

9. The air filter assembly of claim 8 wherein said filter outlet port is disposed on a vertical side of said housing and said filter medium is a pleated filter with vertically oriented pleats whereby said pleats guide the movement of particulates downward and towards said exit opening.

10. The air filter assembly of claim 8 further comprising:

a precleaning filter disposed between said opening inlet and said filter medium; and a plurality of tabs extending into said passageway whereby said precleaning filter is retained in a position outside of said passageway.

11. A method of filtering air for an internal combustion engine comprising:

generating a stream of air at a pressure and velocity with a blower attached to a drive shaft of the engine;

supplying a portion of the air stream to an inlet opening in a filter housing, said filter housing enclosing a filter compartment and further defining an exit opening and a filter outlet port;

providing a filter medium within said filter housing between said inlet opening and said filter outlet port to thereby define with said filter housing a passageway between said inlet opening and said exit opening;

directing a portion of the supplied air from said inlet opening through said filter medium and filter outlet opening to an air-fuel mixing device; and directing a remaining portion of the supplied air from said inlet opening through said passageway and discharging the remaining portion through said exit opening.

12. The method claim 11 wherein said exit opening is disposed opposite and below said inlet opening and said passageway is in a substantially straight line of sight between said inlet opening and said exit opening.

13. The method of claim 12 wherein said filter outlet port is disposed on a vertical side of said housing and said filter medium is a pleated filter with vertically oriented pleats whereby said pleats guide the movement of particulates downward and towards said exit opening.

14. The method of claim 13 further comprising:

inserting a precleaning filter between said opening inlet and said filter medium; and providing on said filter housing a plurality of tabs extending into said passageway whereby said precleaning filter is retained in a position outside of said passageway.

* * * * *